US010968055B2

(12) United States Patent
Guernsey et al.

(10) Patent No.: US 10,968,055 B2
(45) Date of Patent: Apr. 6, 2021

(54) MONORAIL TRAY CONVEYOR WITH PASSIVE GUIDE RAILS

(71) Applicant: Laitram, L.L.C., Harahan, LA (US)

(72) Inventors: Kevin W. Guernsey, Destin, FL (US); Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/642,771

(22) PCT Filed: Aug. 30, 2018

(86) PCT No.: PCT/US2018/048839
§ 371 (c)(1),
(2) Date: Feb. 27, 2020

(87) PCT Pub. No.: WO2019/055227
PCT Pub. Date: Mar. 21, 2019

(65) Prior Publication Data
US 2020/0299074 A1    Sep. 24, 2020

Related U.S. Application Data

(60) Provisional application No. 62/558,055, filed on Sep. 13, 2017.

(51) Int. Cl.
*B65G 54/02* (2006.01)
*B65G 21/20* (2006.01)
*B65G 47/38* (2006.01)
*B65G 47/96* (2006.01)

(52) U.S. Cl.
CPC ......... *B65G 54/02* (2013.01); *B65G 21/2063* (2013.01); *B65G 47/38* (2013.01); *B65G 47/962* (2013.01)

(58) Field of Classification Search
CPC .... B65G 54/02; B65G 21/2063; B65G 47/38; B65G 47/962
USPC ......................................................... 198/619
See application file for complete search history.

(56) References Cited

U.S. PATENT DOCUMENTS

| 4,231,689 A | 11/1980 | Carstens |
| 4,595,870 A | 6/1986 | Chitavat |
| 4,742,778 A | 5/1988 | Morishita et al. |
| 4,802,761 A | 2/1989 | Bowen et al. |

(Continued)

FOREIGN PATENT DOCUMENTS

| GB | 2133757 B | 1/1987 |
| JP | 05-077921 A | 3/1993 |

(Continued)

OTHER PUBLICATIONS

U.S. Appl. No. 16/337,539, Linear-Motor Conveyor System, Mar. 28, 2019.

(Continued)

*Primary Examiner* — James R Bidwell
(74) *Attorney, Agent, or Firm* — James T. Cronvich

(57) ABSTRACT

A tray conveyor with trays driven by a linear synchronous motor. The trays are supported on a pair of guide rails in a conveyor frame. The trays include a permanent-magnet array whose magnetic field interacts with a traveling electromagnetic wave produced by a linear-motor stator extending along the conveyor between the guide rails to propel the tray in a conveying direction.

19 Claims, 4 Drawing Sheets

(56) References Cited

U.S. PATENT DOCUMENTS

| | | |
|---|---|---|
| 5,251,741 A | 10/1993 | Morishita et al. |
| 5,287,026 A | 2/1994 | Ogihara et al. |
| 5,473,992 A | 12/1995 | Takei |
| 5,590,995 A | 1/1997 | Berkers et al. |
| 5,881,649 A | 3/1999 | Hasegawa et al. |
| 5,886,432 A | 3/1999 | Markle |
| 5,906,262 A | 5/1999 | Miki |
| 5,925,956 A | 7/1999 | Ohzeki |
| 5,965,963 A | 10/1999 | Chitayat |
| 6,045,319 A | 4/2000 | Uchida et al. |
| 6,097,014 A | 8/2000 | Kirsch |
| 6,191,507 B1 * | 2/2001 | Peltier .................. B65G 54/02 310/12.02 |
| 6,250,230 B1 | 6/2001 | Post |
| 6,274,952 B1 | 8/2001 | Chitayat |
| 6,397,990 B1 | 6/2002 | Brien et al. |
| 6,531,793 B1 | 3/2003 | Frissen et al. |
| 6,568,332 B1 | 5/2003 | Hotzinger et al. |
| 6,578,495 B1 | 6/2003 | Yitts et al. |
| 6,580,185 B2 | 6/2003 | Kang et al. |
| 6,684,794 B2 | 2/2004 | Fiske et al. |
| 6,917,136 B2 | 7/2005 | Thornton et al. |
| 6,983,701 B2 * | 1/2006 | Thornton ................ B60L 13/06 104/282 |
| 7,458,454 B2 | 12/2008 | Mendenhall |
| 7,730,840 B2 | 6/2010 | Reichel et al. |
| 7,948,122 B2 | 5/2011 | Compter et al. |
| 8,136,453 B2 | 3/2012 | Hunter et al. |
| 8,177,048 B2 * | 5/2012 | Sato ........................ H01F 38/14 198/619 |
| 8,193,886 B2 | 6/2012 | Hahn et al. |
| 8,359,981 B2 | 1/2013 | Hahn et al. |
| 8,407,915 B2 | 4/2013 | George et al. |
| 8,485,350 B2 | 7/2013 | Reinisch et al. |
| 8,528,486 B2 | 9/2013 | Lee |
| 8,857,625 B1 * | 10/2014 | Oropeza ................ B65G 15/30 209/698 |
| 8,967,051 B2 | 3/2015 | King et al. |
| 9,032,880 B2 | 5/2015 | King et al. |
| 9,045,183 B2 | 6/2015 | Laurence et al. |
| 9,202,719 B2 | 12/2015 | Lu et al. |
| 9,260,210 B2 | 2/2016 | Jacobs et al. |
| 9,346,371 B2 | 5/2016 | King et al. |
| 9,394,114 B2 | 7/2016 | Hanisch et al. |
| 9,446,902 B2 | 9/2016 | Aumann et al. |
| 9,604,795 B2 | 3/2017 | Aumann et al. |
| 9,611,107 B2 | 4/2017 | Wernersbach et al. |
| 9,685,849 B2 | 6/2017 | Lu et al. |
| 9,701,488 B2 | 7/2017 | Paweletz |
| 9,906,110 B2 | 2/2018 | Sommerhalter, Jr. |
| 9,950,524 B2 | 4/2018 | Shinkai et al. |
| 9,988,165 B2 | 6/2018 | Jacobs et al. |
| 10,112,777 B2 | 10/2018 | King et al. |
| 10,227,182 B2 | 3/2019 | Burk et al. |
| 2003/0011093 A1 | 1/2003 | Cser |
| 2011/0100252 A1 | 5/2011 | Fukukawa |
| 2015/0083018 A1 | 3/2015 | Clark et al. |
| 2015/0083549 A1 * | 3/2015 | Ram ...................... B65G 47/46 198/358 |
| 2016/0325938 A1 | 11/2016 | King et al. |
| 2017/0050332 A1 | 2/2017 | Bauer et al. |
| 2017/0331359 A1 | 11/2017 | Paweletz et al. |
| 2017/0341255 A1 | 11/2017 | Burk et al. |

FOREIGN PATENT DOCUMENTS

| | | |
|---|---|---|
| JP | 07-228346 A | 8/1995 |
| KR | 10-0692388 B1 | 3/2007 |
| KR | 10-1203890 B1 | 11/2012 |
| WO | 2004011351 A2 | 2/2004 |
| WO | 2009083889 A1 | 7/2009 |
| WO | 2010-092473 A1 | 8/2010 |
| WO | 20188067567 A1 | 4/2018 |

OTHER PUBLICATIONS

U.S. Appl. No. 16/609,694, Tray Conveyor Driven by Brushless DC Motor, Oct. 30, 2019.

U.S. Appl. No. 16/619,817, Monorail Tray Conveyor, Dec. 5, 2019.

* cited by examiner

MONORAIL TRAY CONVEYOR WITH PASSIVE GUIDE RAILS

BACKGROUND

The invention relates to power-driven conveyors. In particular, it relates to tray conveyors driven by linear synchronous motors.

Transport systems in which carriers driven by linear synchronous motors route individual carriers along various paths are used to convey articles to selected destinations. An example of such a transport system is described in U.S. Pat. No. 8,967,051, "Transport System Powered by Short Block Linear Synchronous Motors and Switching Mechanism," to Nathanael N. King et al. of Magnemotion, Inc., Devens, Mass., U.S.A., Mar. 3, 2015. These systems work well, but are not easy to clean. The housings of the linear-motor stators present large, flat, closed upper surfaces that collect grease and other food particles in food-processing applications. Unless properly cleaned, the surfaces can become contaminated with bacteria. And hard-to-access undercut surfaces in the transport system can harbor those bacteria.

SUMMARY

One version of a tray conveyor embodying features of the invention comprises a tray that extends in length from a first end to a second end and in width from a first side to a second side. The tray has a permanent-magnet array extending along its length. A conveyor frame extends in length in a conveying direction. A linear-motor stator mounted in the conveyor frame produces an electromagnetic wave that travels along the length of the conveyor frame. A pair of guide rails flanking the linear-motor stator support the tray on opposite sides of the permanent-magnet array. The electromagnetic wave interacts with the permanent-magnet array to propel the tray along the guide rails in the conveying direction.

Another version of a tray conveyor comprises a tray extending in length from a first end to a second end and in width from a first side to a second side. The tray includes an article-supporting top and a bottom that has a first flat surface extending from the first side toward the second side, a second flat surface extending from the second side toward the first side, and a downward-facing central ridge between the first and second flat surfaces. The central ridge has a concave groove that extends along the length of the tray. A permanent-magnet array is housed in the central ridge interior to and along the groove. Passive guide rails defining a conveying path in a conveying direction support the tray under the first and second first and second flat surfaces. A linear-motor stator extending in length between the guide rails produces an electromagnetic wave that travels along the conveying path. A housing for the linear-motor stator has a convex upper surface received in the concave groove. The electromagnetic wave interacts with the permanent-magnet array to propel the tray along the conveying path.

Yet another version of a tray conveyor comprises a tray that extends in length from a first end to a second end and in width from a first side to a second side. A conveyor frame extends in length in a conveying direction. A linear-motor stator mounted in either the conveyor frame or the tray produces an electromagnetic wave that travels along the length of the conveyor frame or the tray. A permanent-magnet array is mounted in and extends along the length of the other of the conveyor frame and the tray. One or more passive guide rails support the tray from below. The electromagnetic wave interacts with the permanent-magnet array to propel the tray along the guide rails in the conveying direction.

DETAILED DESCRIPTION

Figure 1A:
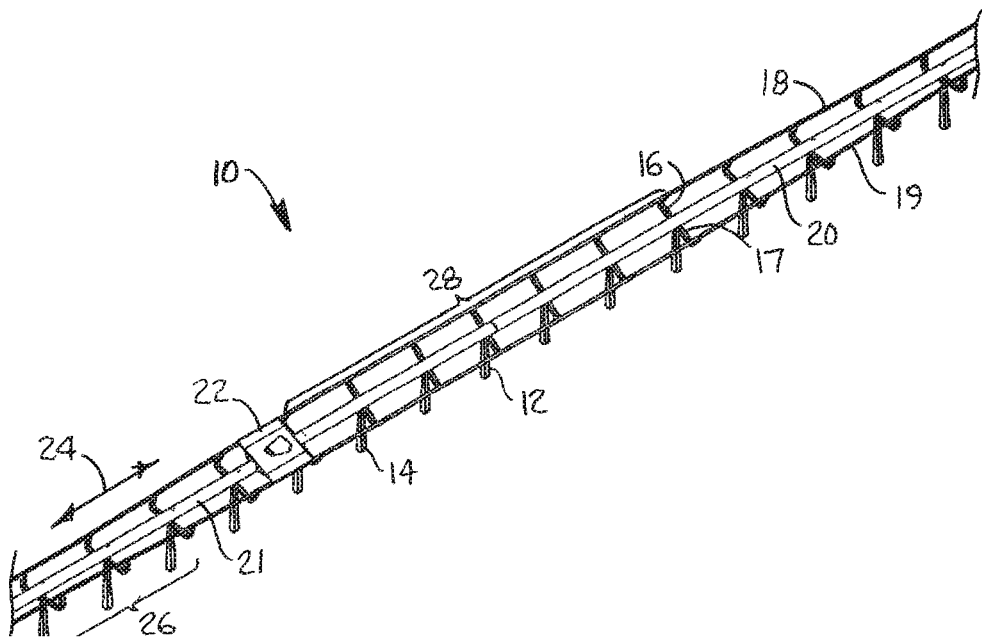
FIGS. 1A and 1B are isometric views of a portion of a tray conveyor embodying features of the invention with the tray on horizontal and tilted conveyor sections.
Figure 1B:
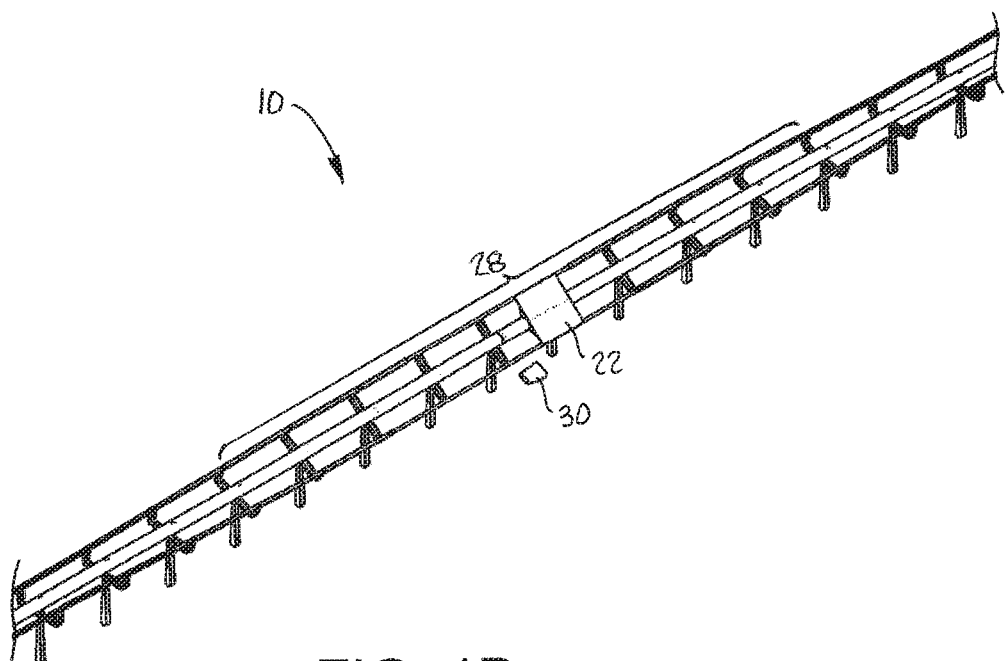

One version of a portion of a tray conveyor embodying features of the invention is shown in FIGS. 1A and 1B. The tray conveyor 10 includes a minimal conveyor frame 12 constructed of a series of T-shaped supports, each including a leg 14 with two arms 16, 17 extending in laterally opposite directions at the top of the leg. A pair of guide rails 18, 19 are supported at the ends of the arms 16, 17 of the series of supports and define a conveying path along the length of the frame 12. A linear-motor stator is housed in a housing 20 supported in the frame 12. The two guide rails 18, 19 flank the stator on opposite sides. The housing 20, which extends along the length of the conveyor frame 12, has a convexly curved upper surface 21. Trays 22, each with an embedded array of permanent magnets, slide on the guide rails 18, 19 propelled by the linear-motor stator in a conveying direction 24, which can be bidirectional. The conveying path includes one or more horizontal sections 26, in which both guide rails 18, 19 define a horizontal plane, and one or more tilted, or banked, sections 28, in which the guide rails define an oblique plane tilted off horizontal. As shown in FIG. 1B, the tray 22, tilted off horizontal on the tilted section 28 of the conveying path, drops conveyed articles 30 off the side of the conveyor 10.

Figure 2:
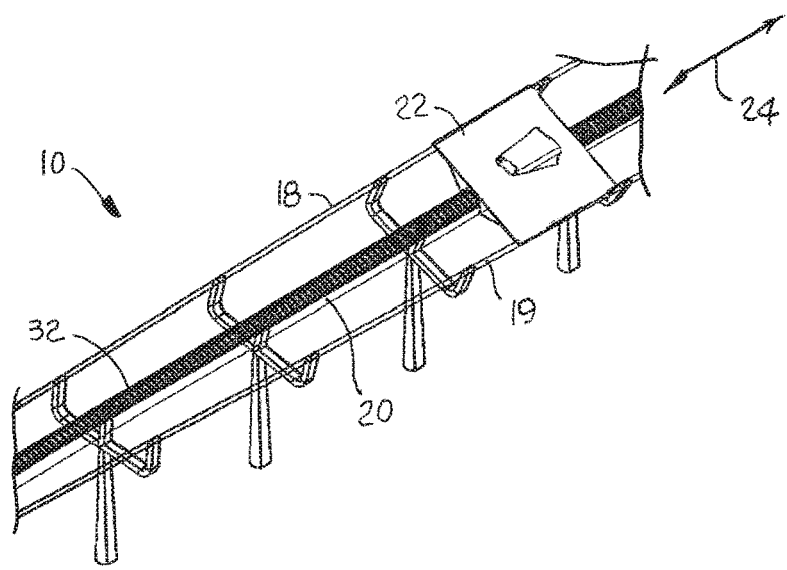
FIG. 2 is an enlarged view of the tray conveyor of FIG. 1B with the stator monorail cut away to show the stator.
Figure 3:
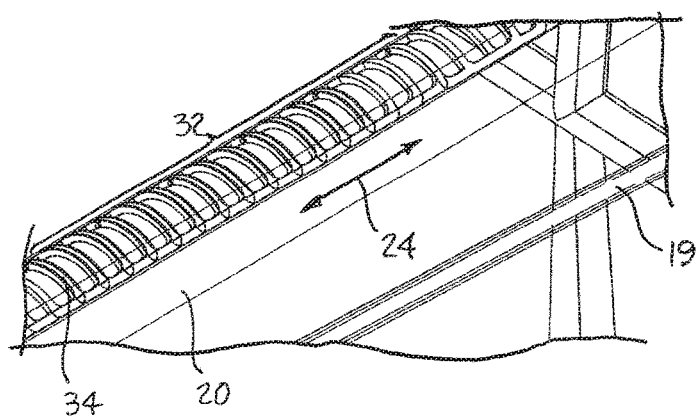
FIG. 3 is an enlarged cutaway view of a portion of the stator monorail of FIG. 2.

Further details of the tray conveyor 10 are shown in FIGS. 2 and 3. The convexly curved upper surface of the stator housing 20 is shown cut away to reveal the linear-motor stator 32. The linear stator 32 includes a series of stator pole faces 34 formed by three-phase windings around stator cores, which can be ironless to reduce the friction of magnetic attraction. The stator 32 is driven conventionally by a three-phase motor drive (not shown). The stator produces an electromagnetic wave that travels along the length of the conveyor 10. The traveling electromagnetic stator wave interacts with the magnetic field of a permanent-magnet array in the tray 22 to produce a force that propels the tray along the guide rails 18, 19 in the conveying direction 24. Thus, the permanent-magnet tray 22, acting as a forcer, forms a linear synchronous motor with the linear stator 32. The stator drive can change the drive-phase sequence to reverse the direction of propagation of the electromagnetic wave and the conveying direction 24. As an alternative, a permanent-magnet array can be mounted in the conveyor frame 12 in place of the linear stator 32, and a linear-motor stator can replace the permanent-magnet array in the tray 22. In the alternative version, the tray includes a coil controller to drive the stator. Power to drive the stator coils and power the controller can be provided by a power source, such as a rechargeable battery in the tray, or by induction from a primary power coil in the conveyor frame, for example. The guide rails 18, 19 are passive in that they are devoid of permanent-magnet arrays or electromagnetic sources. The purpose of the guide rails 18, 19 is to physically support and guide the tray 22 from below. Their tops can be convexly curved to avoid pooling liquids. And they can be of solid construction without voids.

Figure 4:
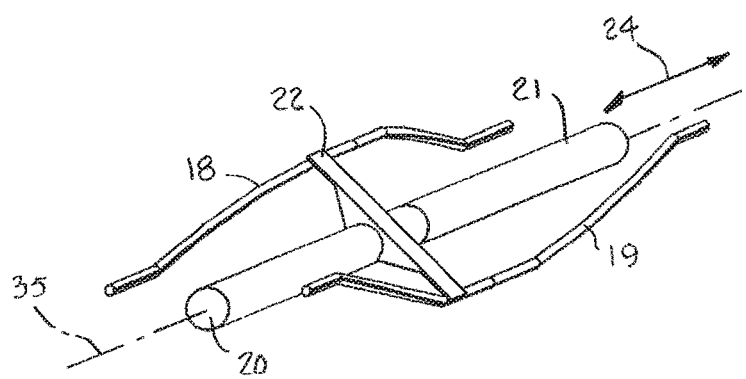
FIG. 4 is an axonometric view of a portion of a bidirectionally tilting tray conveyor section.

The exemplary stator housing 20 shown in FIG. 4 is a tubular monorail with a circular cross section, which naturally has a convex upper surface 21. But the housing 20 can have other cross sections besides circular. The two guide rails 18, 19 are shown with twists and turns, which adjust the tilt of the tray 22 as it advances in the conveying direction 24 along a bidirectionally tilting section. The circular stator housing 20 gives the tray 22 the freedom to tilt over a wide range of tilt angles about the housing's longitudinal axis 35.

Figure 5:
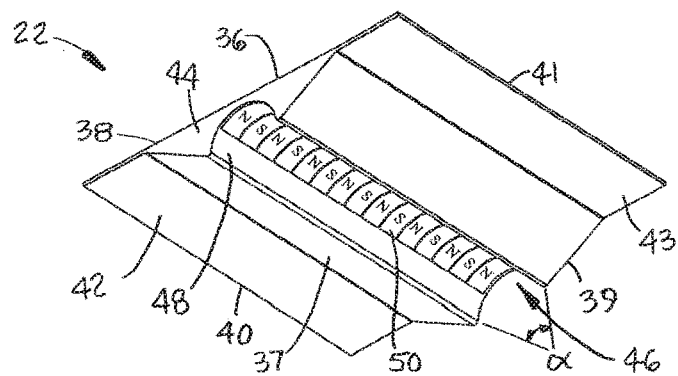
FIG. 5 is an axonometric underside view of a tray usable with the tray conveyor of FIG. 1A.
Figure 9:
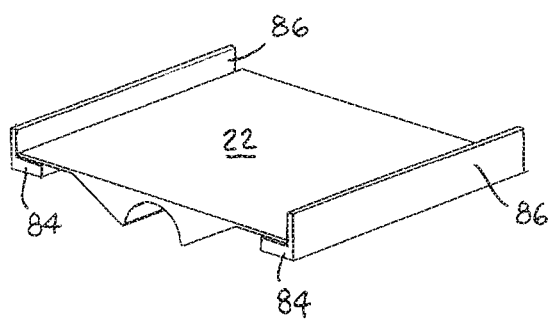
FIG. 9 is an isometric view of a tray as in FIG. 5 on L-shaped guide rails.

The tray 22 is shown in more detail in FIG. 5. The tray 22 has a flat article-supporting top 36 and a bottom 37 that extend in length from a first end 38 to second end 39 and in width from a first side 40 to a second side 41. The bottom 37 has a first flat surface 42 that extends laterally inward from the first side 40 toward the second side 41 and a second flat surface 43 that extends laterally inward from the second side toward the first side. A downward-facing central ridge 44 extends the length of the tray 22 along the bottom 37 between the first and second flat surfaces 42, 43. A groove 46 extending along the length of the tray 22 is formed in the ridge 44. A concavely curved surface 48 on the ridge 44 bounds and defines the shape of the groove 46. A permanent-magnet array 50 extends along the concavely curved surface 48 bounding the groove 46. The array 50 is shown with magnets arranged with alternating poles N, S, but could alternatively be arranged to form a Halbach array. The pole faces of the magnets in the array are also concave to conform to the concave surface 48. The concave groove 46 is complementary in shape to the convex top 21 of the stator housing 20 (FIG. 1) to receive the stator housing along which the tray 22 rides further supported in sliding contact by the guide rails 18, 19 (FIG. 1). The concave groove subtends an arc α of less than 180° so that the tray 22 can be removed simply by lifting it off the conveyor 10 (FIG. 1). The tray 22 has no structural elements that interlock with the guide rails or the stator housing. And the minimal, open conveyor frame has no hard-to-access undercut surfaces. L-shaped guide rails 84 with vertical walls 86 as shown in FIG. 9 can be used instead of the guide rails 18, 19 of FIG. 1 to limit lateral drift of the tray 22. The vertical walls 86 extend to a height above the height of the tray 22.

Figure 6:
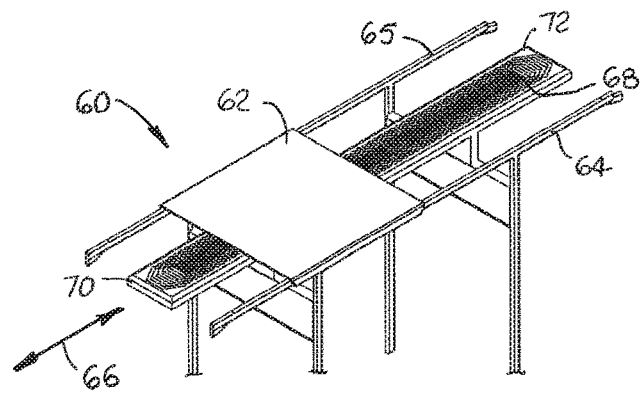
FIG. 6 is an isometric view of another version of a modular tray conveyor embodying features of the invention.
Figure 7:
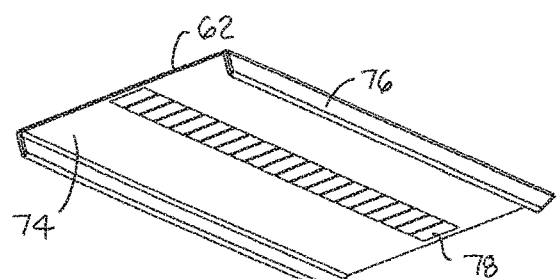
FIG. 7 is an axonometric underside view of a tray usable with the tray conveyor of FIG. 6.
Figure 8:
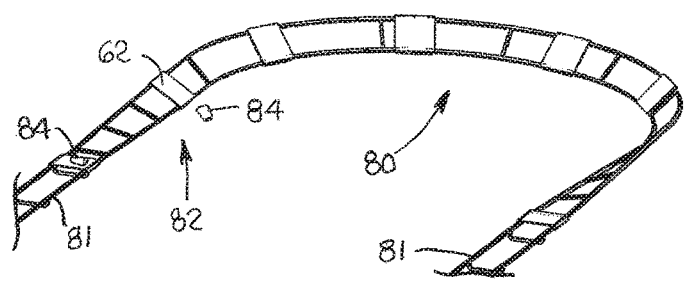
FIG. 8 is an axonometric view of a portion of a conveyor system having a banked turn and a tilted sorting section.

Another version of a section of a tray conveyor embodying features of the invention is shown in FIGS. 6-8. FIG. 6 shows a modular conveyor section 60 that has a flat tray 62 supported by passive guide rails 64, 65 and propelled in a conveying direction 66 by a central linear-motor stator 68. The stator is housed in a modular housing 70 that has a flat top surface 72. The straight modular sections 60 and curved modular sections can be joined together end to end to build a complete tray conveyor. The stator in each modular section can be independently controlled to provide independent control of the trays 62 in a control zone coextensive with the modular section. Or each modular conveyor section can be divided into multiple independent contiguous control zones. The tray 62 has a flat bottom 74 between downwardly extending projections, such as skirts 76, 77, posts, or the sides of inverted U-shaped retainers. The projections extend the length of the tray along laterally opposite sides. An array of permanent magnets 78 extends in length along the bottom 74 of the tray 62. The stator 68 produces an electromagnetic wave that travels along the length of the conveyor 60 and interacts with the magnetic field of the permanent-magnet array 78 to produce a force that propels the tray 62 in the conveying direction 66. Alternatively, the linear-motor stator 68 can be positioned offset to one side of the centerline of the tray 62, and the linear-motor stator 68 can likewise be offset from the centerline of the conveyor 69 with both guide rails on the same side of the stator. The offset arrangement applies as well to the design of the tray conveyors of FIGS. 1-6. Furthermore, one or more passive rails, not exclusively two as shown, can be used in alternative versions of the tray conveyors. The skirts 76, 77 depend downward from the tray 62 outside the two guide rails 64, 65. Contact between the skirts 76, 77 and the guide rails 64, 65 limits lateral drift of the tray 62 and prevents it from sliding down steeply banked sections of the conveyor path as in the banked turn section 80 in the conveyor section shown in FIG. 8. (The central monorail stator housing is not shown in FIG. 8 to simplify the drawing.) The conveyor, only half of which is shown in FIG. 8, has two horizontal sections 81 joined with the banked turn section 80 and an opposite banked turn section (not shown) to form an endless conveyor loop. The skirts 76, 77 also maintain the tray's permanent-magnet array 78 aligned with the stator 68 to maximize coupling of the stator field with the permanent-magnet field. The conveyor section 82 entering the turn 80 is tilted to divert an article 84 from the tray 62. Like the tray 22 of FIG. 5, the tray 62 of FIG. 7 can be removed from the conveyor 60 simply by lifting because there is no interlocking structure in the tray engaging the conveyor frame. And the minimal structure of the conveyor frame is open and easy to dean.

What is claimed is:
1. A tray conveyor comprising:
a tray extending in length from a first end to a second end and in width from a first side to a second side and having a bottom with flat surface areas at the first and second sides and having a permanent-magnet array extending along its length;
a conveyor frame extending in length in a conveying direction;
a linear-motor stator mounted in the conveyor frame and producing an electromagnetic wave traveling along the length of the conveyor frame;
a pair of guide rails flanking the linear-motor stator across gaps separating the linear-motor stator from the pair of guide rails and supporting the tray from below in contact with the flat surface areas at the first and second sides of the tray on opposite sides of the permanent-magnet array;
wherein the electromagnetic wave interacts with the permanent-magnet array to propel the tray along the guide rails in the conveying direction.
2. A tray conveyor as in claim 1 wherein the tray has projections extending downward at the first and second sides outside the guide rails to limit lateral drift of the tray by contact with the guide rails.

3. A tray conveyor as in claim 1 wherein the guide rails have vertical walls that extend to a height above the height of the tray to limit lateral drift of the tray by contact with the vertical walls.

4. A tray conveyor as in claim 1 wherein the guide rails define a conveying path that is horizontal along a first section of the conveying path and banked along a second section.

5. A tray conveyor as in claim 4 wherein the second section of the endless path is banked steeply enough for an article carried on the tray to fall off the first side of the tray.

6. A tray conveyor as in claim 1 comprising a housing for the linear-motor stator with a convexly curved upper surface and wherein the tray has a bottom with a concavely curved groove complementary in shape with the convexly curved upper surface of the housing.

7. A tray conveyor as in claim 6 wherein the housing has a circular cross section.

8. A tray conveyor as in claim 6 wherein the groove is circular and subtends an arc of less than 180°.

9. A tray conveyor as in claim 1 wherein the magnets in the permanent-magnet array have concavely curved, downward-facing pole faces and wherein the linear-motor stator has upward-facing, convex stator pole faces.

10. A tray conveyor as in claim 1 wherein the guide rails are passive guide rails devoid of sources of electromagnetism.

11. A tray conveyor as in claim 1 wherein the conveyor frame comprises a plurality of modular conveyor sections joined end to end, wherein each of the modular conveyor sections supports a length of the pair of guide rails and a length of the linear-motor stator to form an independent control zone coextensive with the modular conveyor section for propelling each of the trays passing through the control zone independently of the control zones in the other modular sections.

12. A tray conveyor comprising:
a tray extending in length from a first end to a second end and in width from a first side to a second side and including:
  an article-supporting top;
  a bottom having a first flat surface extending from the first side toward the second side, a second flat surface extending from the second side toward the first side, and a downward-facing central ridge between the first and second flat surfaces with a concave groove that extends along the length of the tray;
  a permanent-magnet array housed in the central ridge interior to and along the groove;
first and second passive guide rails defining a conveying path in a conveying direction and supporting the tray under the first and second flat surfaces;
a linear-motor stator extending in length between the first and second guide rails and producing an electromagnetic wave that travels along the conveying path;
a housing for the linear-motor stator having a convex upper surface received in the concave groove;
wherein the electromagnetic wave interacts with the permanent-magnet array to propel the tray along the conveying path.

13. A tray conveyor as in claim 12 wherein the conveying path is horizontal along a first section of the conveying path and banked along a second section.

14. A tray conveyor as in claim 13 wherein the second section of the endless path is banked steeply enough for an article carried on the tray to fall off the first side of the tray.

15. A tray conveyor as in claim 12 wherein the housing for the linear-motor stator has a circular cross section.

16. A tray conveyor as in claim 12 wherein the groove is circular and subtends an arc of less than 180°.

17. A tray conveyor as in claim 12 wherein the magnets in the permanent-magnet array have concavely curved, downward-facing pole faces and wherein the linear-motor stator has upward-facing, convex stator pole faces.

18. A tray conveyor as in claim 12 wherein the conveying path is horizontal along two horizontal sections of the conveying path and banked along two banked turn sections joined with the two horizontal sections to form an endless conveyor loop.

19. A tray conveyor comprising:
a tray extending in length from a first end to a second end and in width from a first side to a second side and having a bottom with flat surface areas at the first and second sides;
a conveyor frame extending in length in a conveying direction;
a linear-motor stator mounted in one of the conveyor frame and the tray acid producing an electromagnetic wave traveling along the length of the conveyor frame or the tray;
a permanent-magnet array mounted in and extending along the length of the other of the conveyor frame and the tray;
a pair of passive guide rails flanking the linear-motor stator across gaps separating the linear-motor stator from the pair of guide rails and supporting the tray from below in contact with the flat surface areas at the first and second sides of the tray;
wherein the electromagnetic wave interacts with the permanent-magnet array to propel the tray along the guide rails in the conveying direction.

* * * * *